United States Patent
Tsuchida et al.

(10) Patent No.: US 9,472,986 B2
(45) Date of Patent: Oct. 18, 2016

(54) ROTOR

(75) Inventors: Kazuchika Tsuchida, Tokyo (JP); Masahiro Nigo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/366,732

(22) PCT Filed: Dec. 26, 2011

(86) PCT No.: PCT/JP2011/080054
§ 371 (c)(1),
(2), (4) Date: Jun. 19, 2014

(87) PCT Pub. No.: WO2013/098912
PCT Pub. Date: Jul. 4, 2013

(65) Prior Publication Data
US 2014/0346911 A1 Nov. 27, 2014

(51) Int. Cl.
*H02K 1/27* (2006.01)
*H02K 1/24* (2006.01)

(52) U.S. Cl.
CPC ............ *H02K 1/2766* (2013.01); *H02K 1/246* (2013.01); *H02K 1/276* (2013.01); *H02K 2213/03* (2013.01)

(58) Field of Classification Search
CPC ........ H02K 1/27; H02K 1/246; H02K 1/276; H02K 1/2766
USPC ........................................ 310/156.53, 156.38
See application file for complete search history.

(56) References Cited

U.S. PATENT DOCUMENTS

| | | | | |
|---|---|---|---|---|
| 4,139,790 A | * | 2/1979 | Steen | ...................... H02K 21/46 310/156.83 |
| 5,818,139 A | * | 10/1998 | Yamagiwa | ............. H02K 1/276 310/156.45 |
| 6,259,181 B1 | | 7/2001 | Kawano et al. | |
| 6,300,703 B1 | | 10/2001 | Kawano et al. | |
| 7,459,821 B2 | | 12/2008 | Cheong et al. | |

(Continued)

FOREIGN PATENT DOCUMENTS

| | | |
|---|---|---|
| CN | 1741354 A | 3/2006 |
| CN | 101617457 A | 12/2009 |

(Continued)

OTHER PUBLICATIONS

Office Action mailed Nov. 4, 2014 issued in corresponding JP patent application No. 2013-551054 (and English translation).

(Continued)

*Primary Examiner* — Burton Mullins
(74) *Attorney, Agent, or Firm* — Posz Law Group, PLC

(57) ABSTRACT

A rotor includes a rotor iron core in which magnet insertion holes that are arrayed in a radial direction so as to be convex toward an inner peripheral side are provided for each magnetic pole, and in which the magnet insertion holes are arranged in a circumferential direction according to the number of magnetic poles, and flat-shaped permanent magnets that are inserted respectively in the magnet insertion holes, wherein the magnet insertion holes, which are arranged on an innermost peripheral side and adjacent to each other in a circumferential direction are provided in such a manner that the width of the magnet insertion hole gradually becomes larger toward the inner peripheral side such that the width of the iron core between the adjacent magnet insertion holes in a circumferential direction is constant in a radial direction.

8 Claims, 4 Drawing Sheets

(56) References Cited

U.S. PATENT DOCUMENTS

| | | | |
|---|---|---|---|
| 7,843,100 B2* | 11/2010 | Blissenbach et al. | H02K 1/02 310/156.38 |
| 8,040,009 B2 | 10/2011 | Aota et al. | |
| 8,193,672 B2* | 6/2012 | Oh et al. | H02K 1/276 310/156.07 |
| 8,513,850 B2* | 8/2013 | Evans | H02K 1/276 310/156.01 |
| 8,525,381 B2* | 9/2013 | Yabe et al. | H02K 1/276 310/156.53 |
| 8,714,948 B2* | 5/2014 | Baba et al. | H02K 1/276 310/156.45 |
| 2003/0094875 A1 | 5/2003 | Sakuma et al. | |
| 2005/0110355 A1* | 5/2005 | Sakuma et al. | H02K 21/14 310/156.53 |
| 2006/0043812 A1* | 3/2006 | Cheong et al. | H01F 13/003 310/156.53 |
| 2006/0103254 A1* | 5/2006 | Horst | H02K 1/276 310/156.53 |
| 2010/0109467 A1 | 5/2010 | Aota et al. | |
| 2011/0193439 A1 | 8/2011 | Yabe et al. | |

FOREIGN PATENT DOCUMENTS

| | | | |
|---|---|---|---|
| CN | 102171909 A | | 8/2011 |
| JP | 10-257700 A | | 9/1998 |
| JP | 11-113198 | * | 4/1999 |
| JP | 11-113199 A | | 4/1999 |
| JP | 11-262265 A | | 9/1999 |
| JP | 2002-272031 A | | 9/2002 |
| JP | 2002-354766 A | | 12/2002 |
| JP | 2008-136298 A | | 6/2008 |
| JP | 2011-030427 A | | 2/2011 |

OTHER PUBLICATIONS

International Search Report of the International Searching Authority mailed Apr. 3, 2012 for the corresponding international application No. PCT/JP2011/080054 (with English translation).

Office Action issued Nov. 9, 2015 in the corresponding CN application No. 201180075936.5 (with partial English translation).

Office Action dated Jul. 5, 2016 issued in corresponding CN patent application No. 201180075936.5 (and partial English translation).

* cited by examiner

ROTOR

CROSS REFERENCE TO RELATED APPLICATION

This application is a U.S. national stage application of International Patent Application No. PCT/JP2011/080054 filed on Dec. 26, 2011.

TECHNICAL FIELD

The present invention relates to a rotor of a rotary electric machine.

BACKGROUND

Patent Literature 1 discloses a synchronous reluctance motor that includes two layers of permanent magnets in a radial direction in the rotor, and that has a configuration in which the total amount of magnetic flux in the permanent magnet on the outer peripheral side is designed to be larger than or substantially equal to the total amount of magnetic flux in the permanent magnet on the inner peripheral side.

PATENT LITERATURE

Patent Literature 1: Japanese Patent Application Laid-open No. 2002-272031

Because a reluctance motor uses reluctance torque in addition to magnet torque, it is desirable for a magnet insertion hole to have a shape that increases the reluctance torque. Although in Patent Literature 1, there are descriptions indicating that a rare-earth magnet is inserted on the outer peripheral side, and a ferrite magnet is inserted on the inner peripheral side, a shape of the magnet insertion hole that can increase the reluctance torque is not mentioned.

The present invention has been achieved to solve the above problems, and an object of the present invention is to provide a rotor that includes a magnet insertion hole having a shape that increases the reluctance torque and makes it possible to obtain a high output.

in order to solve the aforementioned problems, a rotor according to one aspect of the present invention is constructed in such a manner that it includes: a rotor iron core in which a multi-layered magnet insertion holes that are arrayed in a radial direction so as to be convex toward an inner peripheral side are provided for each magnetic pole, and in which the multi-layered magnet insertion holes are arranged in a circumferential direction according to a number of magnetic poles; and flat-shaped permanent magnets, each of which is inserted into the respective magnet insertion holes, wherein the magnet insertion holes, which are arranged on an innermost peripheral side and adjacent to each other in the circumferential direction, are provided in such a manner that the width of each holes gradually becomes larger toward the inner peripheral side so that the width of an iron core between the adjacent magnet insertion holes in the circumferential direction is constant in the radial direction.

The present invention can increase reluctance torque and obtain a high output.

DETAILED DESCRIPTION

Exemplary embodiments of a rotor according to the present invention will be explained below in detail with reference to the accompanying drawings. The present invention is not limited to these embodiments.

Embodiment

Figure 1:
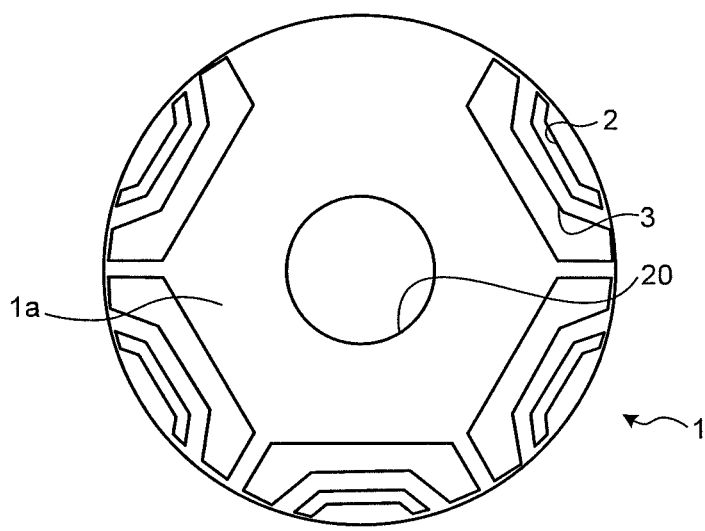
FIG. 1 is a plan view of the shape of a rotor core 1a (a rotor iron core) of a rotor 1 according to an embodiment.
Figure 2:
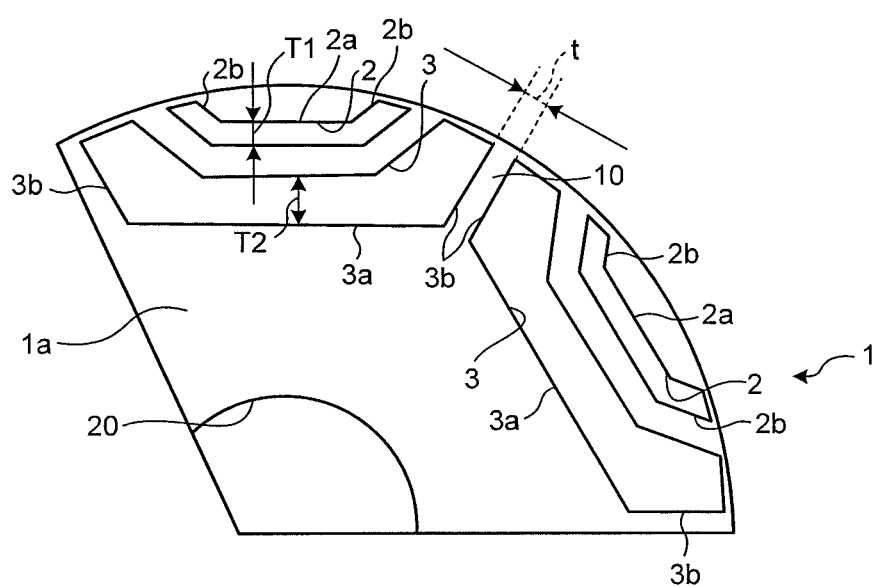
FIG. 2 is a partially enlarged view of FIG. 1.

A motor rotor according to the present embodiment is explained below. FIG. 1 is a plan view of a shape of a rotor core 1a (a rotor iron core) of a rotor 1 according to the present embodiment. FIG. 2 is a partially enlarged view of FIG. 1. The motor is a reluctance motor, for example.

The rotor core 1a is cylindrical, and at the center of the rotor core 1a, a shaft hole 20 is provided, through which a shaft (not shown) is inserted. The rotor core 1a is configured by stacking many thin electromagnetic steel plates that are magnetic materials with a thickness of approximately 0.1 to 1 millimeter. The rotor 1 is rotatably arranged on the inside of a ring-shaped stator (not shown).

In an outer peripheral portion of the rotor core 1a, a plurality of magnet insertion holes 2 and 3 (for example, six holes in an example of FIG. 1) are provided in a circumferential direction, for example at equal intervals. Each of the magnet insertion holes 2 and each of the magnet insertion holes 3 are arrayed in two layers, for example, in the same radial direction. The magnet insertion hole 2 is provided on the outer peripheral side, while the magnet insertion hole 3 is provided on the inner peripheral side. The magnet insertion holes 2 and 3 are arrayed so as to be convex from the outer peripheral side toward the inner peripheral side (that is, toward the center of the rotor). Specifically, the magnet insertion holes 2 and 3 have substantially a dish shape in cross section. In the rotor 1, a magnetic pole is formed for each of the two layers of the magnet insertion holes 2 and 3 that are arrayed in the radial direction.

The magnet insertion hole 2 arranged on the outermost peripheral side is constituted by including a main portion 2a that extends with a constant width T1 in a direction substantially perpendicular to the array direction of the magnet insertion holes 2 and 3 (in the same radial direction) and by including respective end portions 2b that communication with both sides of the main portion 2a and that extend with a constant width T1 toward the outer peripheral side at an obtuse angle with respect to the extending direction of the main portion 2a. The respective end portions 2b are formed symmetrically with respect to the main portion 2a.

The magnet insertion hole 3 arranged on the innermost peripheral side is constituted by including a main portion 3a that extends with a constant width T2 in a direction substantially perpendicular to the array direction of the magnet insertion holes 2 and 3 (in the same radial direction) and by including respective end portions 3b that communicate with both sides of the main portion 3a, and that extend toward the outer peripheral side at an obtuse angle with respect to the extending direction of the main portion 3a. The respective end portions 3b are formed symmetrically with respect to the main portion 3a.

The magnet insertion holes 2 and 3 are arranged substantially parallel to each other. The magnet insertion hole 3 is longer than the magnet insertion hole 2 arranged on the outer peripheral side in both the longitudinal direction and the short direction, in which T2>T1 is established, for example (FIG. 2). Opposed end portions 3b of the adjacent magnet insertion holes 3 are arranged between the magnet insertion holes 2 adjacent to each other in the circumferential direction.

Next, the shape of the end portion 3b of the magnet insertion hole 3 is explained. As shown in FIG. 2, the width of the end portion 3b gradually becomes larger from the outer peripheral side toward the inner peripheral side. Specifically, the width of the end portion 3b is set to gradually become larger toward the center of the rotor such that a width t of an iron core portion 10 that serves as a bridge portion between the opposed end portions 3b is constant in the radial direction. In the example shown in FIG. 2, the width of the end portion 3b is T2 on the outermost peripheral side, and it gradually becomes larger toward the center of the rotor.

Figure 3:
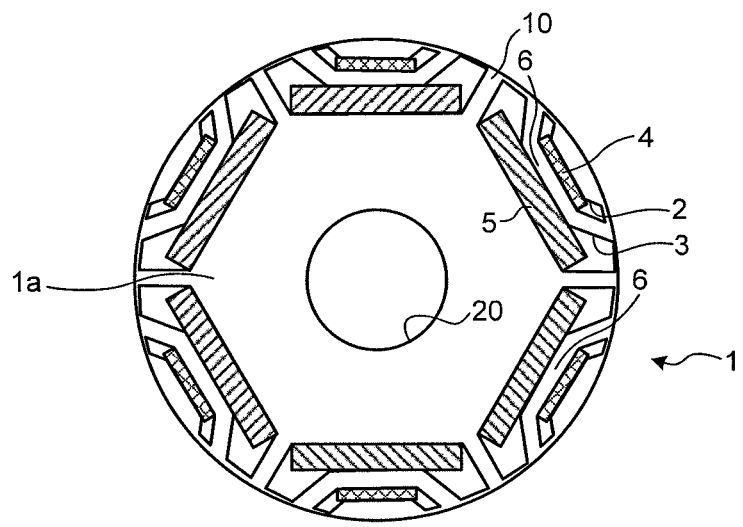
FIG. 3 is a plan view of a configuration of the rotor 1 according to the embodiment.
Figure 4:
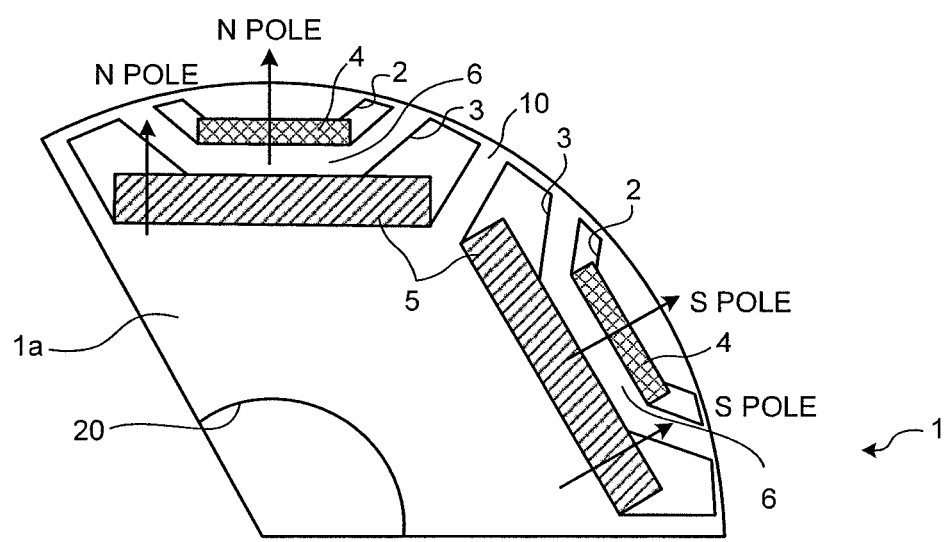
FIG. 4 is a partially enlarged view of FIG. 3.

FIG. 3 is a plan view of a configuration of the rotor 1 according to the present embodiment. FIG. 4 is a partially enlarged view of FIG. 3. As shown in FIGS. 3 and 4, a flat-shaped permanent magnet 4 is inserted into the magnet insertion hole 2, and a flat-shaped permanent magnet 5 is inserted into the magnet insertion hole 3. A set of the permanent magnets 4 and 5 constitutes one magnetic pole of the rotor 1. In the example shown in FIG. 3, the rotor 1 has six magnetic poles.

As shown in FIGS. 1 to 4, the thickness of the permanent magnet 4 (the width of the permanent magnet 4 in the radial direction) is substantially equal to T1. The permanent magnet 4 is arranged in the magnet insertion hole 2 from the main portion 2a to the end portions 2b. A gap is formed in a part of each of the end portions 2b. The thickness of the permanent magnet 5 (the width of the permanent magnet 5 in the radial direction) is substantially equal to T2. The permanent magnet 5 is arranged in the magnet insertion hole 3 from the main portion 3a to the end portions 3b. A gap is formed in a part of each of the end portions 3b. An iron core portion 6 is provided between the magnet insertion holes 2 and 3, and it is used for the magnetic flux, generated by the permanent magnets 4 and 5, to pass through.

The permanent magnets 4 and 5 are magnetized such that the N pole and the S pole are arranged alternately in the radial direction. That is, the permanent magnets 4 and 5 that constitute one magnetic pole are arranged so as to generate magnetic fluxes in the same direction as each other. Further, the permanent magnets 4 and 5 are arranged such that adjacent magnetic poles have opposite polarities to each other. In FIG. 4, two pairs of the permanent magnets 4 and 5 are shown. In one of the pairs, the arrow represents the direction of the N pole, while in the other pair, the arrow represents the direction of the S pole.

Regarding the permanent magnets 4 and 5, for the permanent magnet 4, a rare-earth magnet can be used, and for the permanent magnet 5, a ferrite magnet can be used, for example. That is, the rare-earth magnet is inserted into the magnet insertion hole 2 arranged on the outermost peripheral side, and the ferrite magnet is inserted into the magnet insertion hole 3 arranged on the innermost peripheral side.

In the above explanations, magnet insertion holes that constitute each magnetic pole are formed into two layers, for example. However, the magnet insertion holes can be formed into three or more layers, and three or more permanent magnets can be arrayed for each magnetic pole. In this case, at least the magnet insertion hole arranged on the innermost peripheral side can have the same shape as the magnet insertion hole 3, and the magnet insertion hole arranged on the outermost peripheral side can have the same shape as the magnet insertion hole 2. A ferrite magnet can be inserted into the magnet insertion hole arranged on the innermost peripheral side, and a rare-earth magnet can be inserted in the magnet insertion hole arranged on the outermost peripheral side. Further, the width of the main portion of the magnet insertion hole arranged on the innermost peripheral side is made larger than the width of the main portion of the magnet insertion hole arranged on the outermost peripheral side, in order that the thickness of the rare-earth magnet arranged on the outermost peripheral side can be made smaller than the thickness of the ferrite magnet arranged on the innermost peripheral side. A magnet insertion hole on a middle layer other than the layer on the outermost peripheral side and the layer on the innermost peripheral side can have the same shape as the magnet insertion hole 2 or the magnet insertion hole 3. In this case, the magnet insertion hole with the same shape as the magnet insertion hole 2 can be arranged on the outer peripheral side, and the magnet insertion hole with the same shape as the magnet insertion hole 3 can be arranged on the inner peripheral side, for example.

Figure 5:
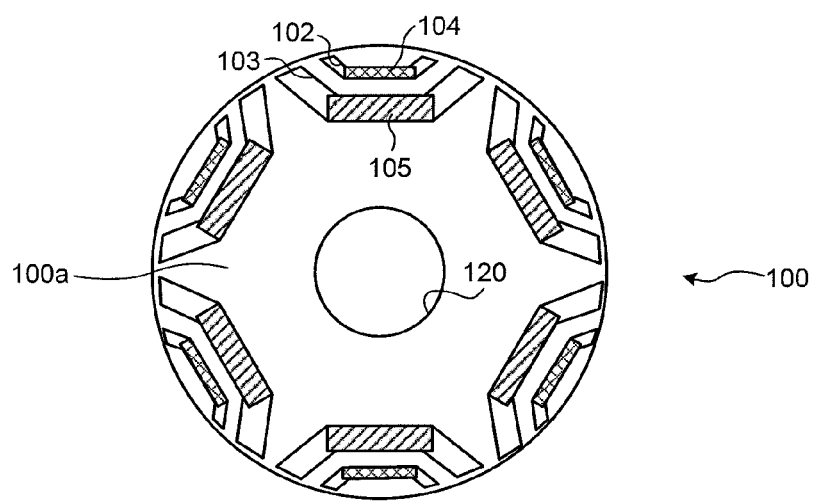
FIG. 5 is a plan view of a configuration of a rotor 100 according to a comparative example.
Figure 6:
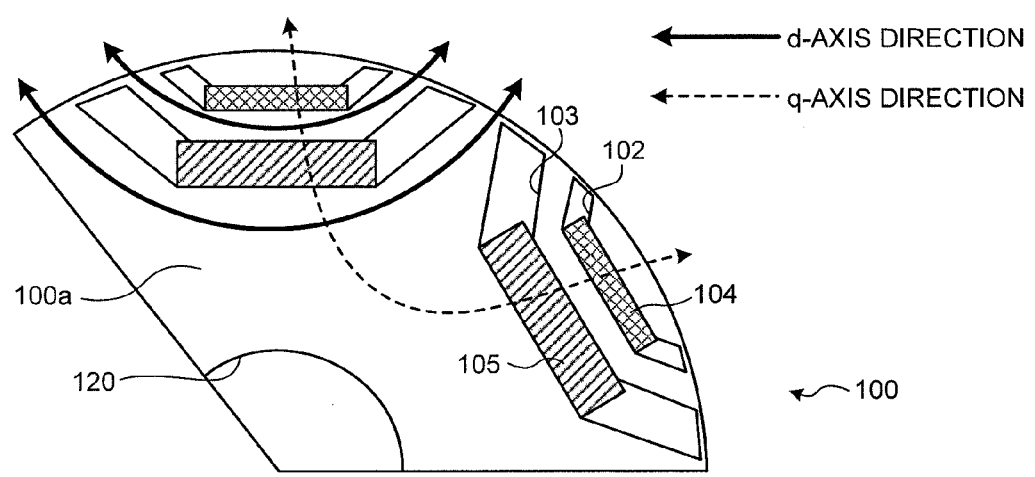
FIG. 6 is a partially enlarged view of FIG. 5.
Figure 7:
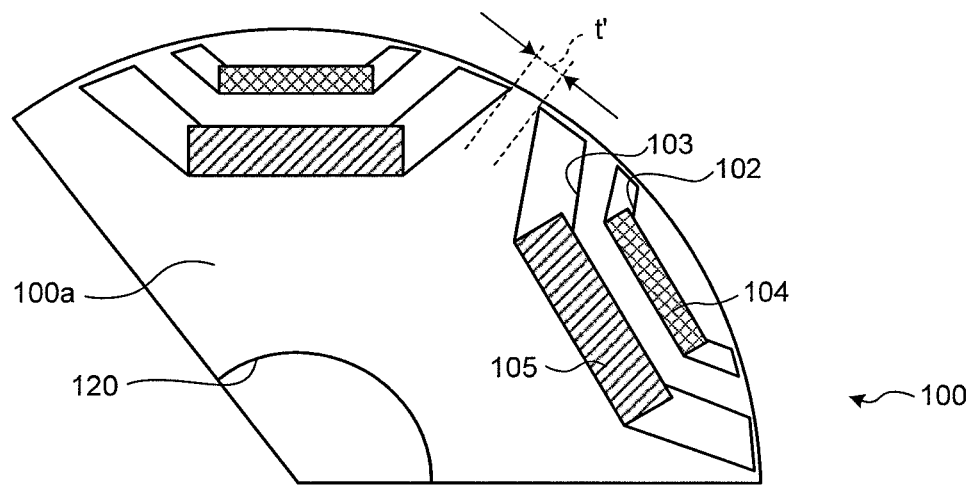
FIG. 7 is a partially enlarged view of FIG. 5.
Figure 8:
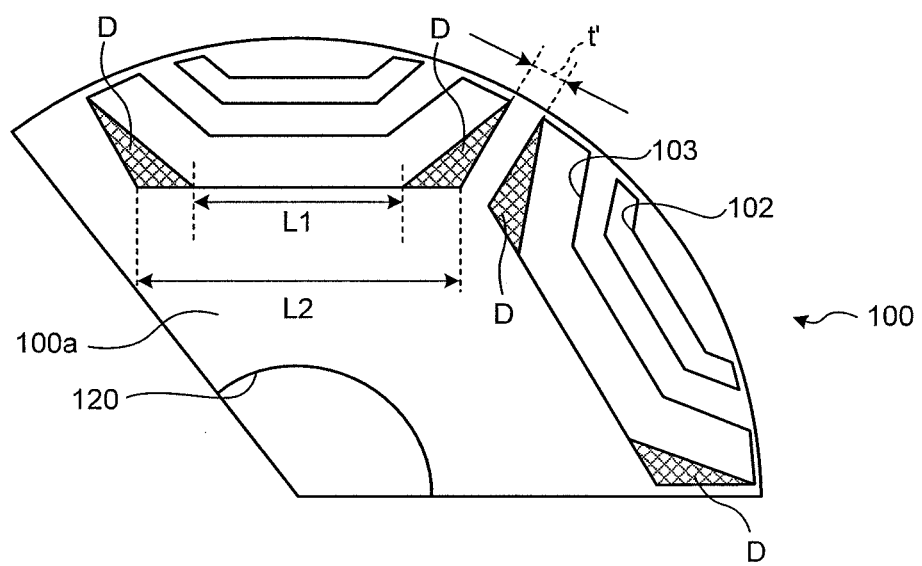
FIG. 8 is a partially enlarged view of FIG. 5.

Next, an operation of the present embodiment is explained. It is necessary for a reluctance motor to use reluctance torque in order to obtain a high output. Reluctance torque is explained below with reference to FIGS. 5 to 8. FIG. 5 is a plan view of a configuration of a rotor 100 according to a comparative example. FIG. 6 is a partially enlarged view of FIG. 5, and depicts a magnetic path. FIG. 7 is a partially enlarged view of FIG. 5, and depicts the width of iron core (hereinafter may be referred to just as "iron-core width") between magnet insertion holes 103 adjacent to each other. FIG. 8 is a partially enlarged view of FIG. 5 and it explains the relation between the shape of the magnet insertion hole 103 and the reluctance torque.

The rotor 100 includes a rotor core 100a in which a shaft hole 120 is provided at its center. In an outer peripheral portion of the rotor core 100a, a plurality of magnet insertion holes 102 and 103 (for example, six holes in an example of FIG. 5) are provided in the circumferential direction, for example at equal intervals, and each of the magnet insertion holes 102 and each of the magnet insertion holes 103 are arrayed into two layers, for example, in the same radial direction. The magnet insertion hole 102 is provided on the outer peripheral side, while the magnet insertion hole 103 is provided on the inner peripheral side. In the rotor 100, a magnetic pole is formed for each of the two layers of the magnet insertion holes 102 and 103 that are arrayed in the radial direction. The magnet insertion holes 102 and 103 have the same shape as the magnet insertion hole 2 in FIGS. 1 to 4, except for the size. That is, in this comparative example, the width of the magnet insertion hole 103 is constant. The magnet insertion hole 103 is longer than the magnet insertion hole 102 in both the longitudinal direction and the short direction. Flat-shaped permanent magnets 104 and 105 are inserted respectively in the magnet insertion holes 102 and 103.

The magnet insertion holes 102 and 103 are filled with air except for a portion in which the permanent magnets 104 and 105 are inserted. Therefore, in the rotor core 100a, a direction in which a magnetic flux easily passes through (a d-axis direction) and a direction in which a magnetic flux hardly passes through (a q-axis direction) are provided (FIG. 6).

The torque τ of the reluctance motor (the reluctance torque) is given as follows, where P represents the number of pairs of poles, Ld represents a d-axis inductance, Lq represents a q-axis inductance, id represents a d-axis current, and iq represents a q-axis current.

$$\tau = P \times (Ld - Lq) \times id \times iq$$

Therefore, to increase the torque τ, it is important to make Ld large and make Lq small. The rotor needs to have a shape such that the magnetic flux in the d-axis direction easily passes through in order to make Ld large, and a magnetic flux in the q-axis direction hardly passes through in order to make Lq small. While in the comparative example, the iron-core width between the magnet insertion holes 102 and 103 is constant, the iron-core width between the magnet insertion holes 103 adjacent to each other is the narrowest (a width t') on the outermost periphery, and it becomes larger toward the inner peripheral side (FIG. 7). In this case, between the magnet insertion holes 103 adjacent to each other, the magnetic flux in the d-axis direction, which flows into or flows out of the rotor 100, is determined by the narrowest part of the iron-core width between the adjacent magnet insertion holes 103, that is, determined by the width t' on the outermost periphery. Therefore, an area D shown by hatching in FIG. 8 is an unnecessary iron-core part for the magnetic flux to pass through.

Accordingly, by forming a gap in the area D, it is possible to make Lq small while Ld is kept constant. This increases the reluctance torque, and thus it can be expected to obtain a high output from the motor. Therefore, in the present embodiment, a portion corresponding to the area D is provided in the magnet insertion hole 3. As shown in FIG. 8, when the area D is formed as a part of a magnet insertion hole, the width (the width in a direction perpendicular to the magnet array direction) of an insertable flat-shaped permanent magnet (for example, a ferrite magnet) is changed from L1 to L2 (L2>L1). Because it is possible to insert a larger-width permanent magnet, a larger magnetic force can be obtained.

In the present embodiment, in order to use a magnetic torque in addition to the above reluctance torque, a rare-earth magnet is inserted into the magnet insertion hole 2, and a ferrite magnet is inserted into the magnet insertion hole 3, for example (FIGS. 3 and 4). With this configuration, it is possible to use the magnetic force of the ferrite magnet as an auxiliary force in addition to the large magnetic force of the rare-earth magnet. If rare-earth magnets are inserted into both the magnet insertion holes 2 and 3, it is possible to further increase the magnetic force. However, this is not preferable because using a large amount of rare-earth material increases costs.

A ferrite magnet has a smaller magnetic coercive force than a rare-earth magnet. When a diamagnetic field from a stator becomes large, there is a possibility of causing demagnetization of the ferrite magnet. Therefore, it is preferable that the thickness of the ferrite magnet is made larger than that of the rare-earth magnet (T1<T2).

In the present embodiment, the rotor includes a rotor iron core in which multi-layered magnet insertion holes that are arrayed in a radial direction so as to be convex toward the inner peripheral side are provided for each magnetic pole, and in which the multi-layered magnet insertion holes are arranged in a circumferential direction according to the number of magnetic poles, and includes flat-shaped permanent magnets, each of which is inserted into the respective magnet insertion holes, wherein the magnet insertion holes, which are arranged on the innermost peripheral side and adjacent to each other in a circumferential direction, are provided in such a manner that the width thereof is set to gradually become larger toward the inner peripheral side so that the iron-core width between the magnet insertion holes in the circumferential direction is constant in a radial direction. Therefore, the reluctance torque can be increased, and a high output is obtained from a motor. Further, the width of the flat-shaped permanent magnet to be inserted can be made large, and it is possible to obtain a large magnetic force and achieve high efficiency.

In the present embodiment, among the multi-layered magnet insertion holes that constitute each magnetic pole, at least a rare-earth magnet is inserted into the magnet insertion hole on the outermost peripheral side, and a ferrite magnet is inserted into the magnet insertion hole on the innermost peripheral side. Therefore, in addition to the magnetic force of the rare-earth magnet on the outermost peripheral side, the magnetic force of the ferrite magnet on the innermost peripheral side is used as an auxiliary force, and accordingly the amount of rare-earth magnet to be used can be reduced, and it is possible to obtain a large magnetic force and achieve high efficiency.

In the present embodiment, the width (the thickness) of the ferrite magnet in a radial direction, which is inserted into the magnet insertion hole on the innermost peripheral side, is larger than the width of the rare-earth magnet that is inserted into the magnet insertion hole on the outermost peripheral side. As described above, a ferrite magnet, which has a smaller magnetic coercive force than that of a rare-earth magnet, has a large thickness so as to be strengthened against demagnetization, and therefore a high-quality motor can be provided.

INDUSTRIAL APPLICABILITY

As described above, the present invention can be suitably applied to a reluctance motor, for example.

The invention claimed is:
1. A rotor comprising:
a rotor iron core in which pairs of multi-layered magnet insertion holes, each including an inner peripheral hole and an outer peripheral hole, that are arrayed in a radial direction are provided for each of a plurality of magnetic poles, and in which the pairs of multi-layered magnet insertion holes are arranged in a circumferential direction according to a number of the magnetic poles; and
flat-shaped permanent magnets, each of which is inserted into the respective magnet insertion holes, wherein
each of the inner peripheral magnet insertion holes arranged on the innermost peripheral side includes:
a first main portion that has a trapezoidal shape with a first lower base and a first upper base extending in a direction perpendicular to the radial direction in parallel, a length of the first lower base being longer than a length of the first upper base, and
first end portions that are continuous to respective lateral sides of the trapezoidal shape of the first main portion and extend from the respective lateral sides toward an outer peripheral side of the rotor iron core at an obtuse angle with respect to an extending direction of the first main portion, each of the first end portions has a flat portion at the outer peripheral side, a width of each of the first end portions gradually becomes larger from the flat portion at the outer peripheral side toward the lateral sides of the trapezoidal shape such that an iron-core width of the rotor iron core between adjacent inner magnetic insertion holes in a circumferential direction is constant in the radial direction, and each of first flat-shaped permanent magnets inserted into the respective inner holes is arranged in the respective magnet insertion hole, a first gap is formed in a part of each of the first end portions, and each of the first flat-shaped permanent magnets inserted into the respective magnet insertion holes arranged on the innermost peripheral side is arranged to fill the first main portion and part of each of the first end portions.

2. The rotor according to claim 1, wherein among the multi-layered magnet insertion holes, a rare-earth magnet is inserted into each of the magnet insertion holes on the outermost peripheral side, and a ferrite magnet is inserted into each of the magnet insertion holes on the innermost peripheral side.

3. The rotor according to claim 2, wherein the width of the rare-earth magnet in the radial direction is smaller than the width of the ferrite magnet in the radial direction.

4. The rotor according to claim 1, wherein each of the magnet insertion holes arranged on the outermost peripheral side comprises:

a second main portion that has a trapezoidal shape with a second lower base and a second upper base extending in a direction perpendicular to an array direction of the multi-layered magnet insertion holes in parallel, a length of the second lower base being longer than that of the second upper base, second end portions that are continuous to respective lateral sides of the trapezoidal shape of the second main portion and extend from the respective lateral sides of the trapezoidal shape toward an outer peripheral side at an obtuse angle with respect to an extending direction of the second main portion, each of second flat-shaped permanent magnets inserted into the respective magnet insertion holes arranged on the outermost peripheral side is arranged in the respective magnet insertion hole from the second main portion to the second end portions, a second gap is formed in a part of each of the second end portions, and each of the second flat-shaped permanent magnets inserted into the respective magnet insertion holes arranged on the outermost peripheral side is arranged to fill the second main portion and part of each of the second end portions.

5. The rotor according to claim 4, wherein the widths of the iron core at portions between the second end portions of the magnet insertion holes arranged on the outermost peripheral side and the first end portions of the magnet insertion holes arranged on the innermost peripheral side are both constant.

6. A motor equipped with the rotor as disclosed in claim 4, wherein each of the second flat-shaped permanent magnets inserted into the respective magnet insertion holes arranged on the outermost peripheral side are arranged to fill the second main portion and part of each of the second end portions.

7. A motor equipped with the rotor as disclosed in claim 1.

8. A motor equipped with the rotor as disclosed in claim 1, wherein each of the first flat-shaped permanent magnets inserted into the respective magnet insertion holes arranged on the innermost peripheral side are arranged to fill the first main portion and part, of each of the first end portions.

* * * * *